US008838778B2

(12) United States Patent
Carter et al.

(10) Patent No.: US 8,838,778 B2
(45) Date of Patent: Sep. 16, 2014

(54) AUTOMATED FEED READER INDEXING

(75) Inventors: Bernadette Alexia Carter, Cary, NC (US); Belinda Ying-Chieh Chang, Pittsburgh, PA (US); Lisa Seacat DeLuca, San Francisco, CA (US); FuYi Li, Sudbury, MA (US); Pamela Ann Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 12/431,200

(22) Filed: Apr. 28, 2009

(65) Prior Publication Data
US 2010/0274889 A1 Oct. 28, 2010

(51) Int. Cl.
G06F 15/173 (2006.01)
G06F 17/30 (2006.01)
H04L 29/08 (2006.01)

(52) U.S. Cl.
CPC ........ *G06F 17/3053* (2013.01); *G06F 17/3089* (2013.01); *G06F 17/3005* (2013.01); *G06F 17/30705* (2013.01); *H04L 29/0809* (2013.01)
USPC ............................ 709/224; 709/246; 715/738

(58) Field of Classification Search
None
See application file for complete search history.

(56) References Cited

U.S. PATENT DOCUMENTS

| | | | | |
|---|---|---|---|---|
| 6,964,013 B1* | 11/2005 | Ono et al. | | 715/207 |
| 7,028,044 B2* | 4/2006 | Hollaar et al. | | 1/1 |
| 7,610,051 B2* | 10/2009 | Dunko et al. | | 455/456.1 |
| 7,761,423 B1* | 7/2010 | Cohen | | 707/637 |
| 7,912,836 B2* | 3/2011 | Tuttle et al. | | 707/723 |
| 7,913,247 B2* | 3/2011 | Diederichs | | 717/173 |
| 7,930,290 B2* | 4/2011 | Farouki | | 707/710 |
| 7,984,056 B1* | 7/2011 | Kane | | 707/749 |
| 8,010,645 B2* | 8/2011 | Shivaji Rao | | 709/223 |
| 8,065,383 B2* | 11/2011 | Carlson et al. | | 709/217 |
| 8,255,521 B1* | 8/2012 | Natarajan et al. | | 709/224 |
| 8,495,210 B1* | 7/2013 | Natarajan et al. | | 709/224 |
| 2002/0143691 A1* | 10/2002 | Ramaley et al. | | 705/37 |
| 2003/0046421 A1* | 3/2003 | Horvitz et al. | | 709/238 |
| 2005/0138540 A1* | 6/2005 | Baltus et al. | | 715/511 |
| 2005/0216439 A1* | 9/2005 | Kawakita | | 707/1 |
| 2006/0167860 A1* | 7/2006 | Eliashberg et al. | | 707/3 |
| 2007/0022174 A1* | 1/2007 | Issa | | 709/217 |
| 2007/0038718 A1* | 2/2007 | Khoo et al. | | 709/206 |
| 2007/0038934 A1* | 2/2007 | Fellman | | 715/700 |
| 2007/0043766 A1* | 2/2007 | Nicholas et al. | | 707/104.1 |
| 2007/0100960 A1* | 5/2007 | Eichstaedt et al. | | 709/217 |
| 2007/0168340 A1* | 7/2007 | Mahoney et al. | | 707/4 |
| 2007/0294646 A1* | 12/2007 | Timmons | | 715/864 |
| 2008/0010337 A1* | 1/2008 | Hayes et al. | | 709/202 |
| 2008/0021963 A1* | 1/2008 | Jana et al. | | 709/206 |
| 2008/0034056 A1* | 2/2008 | Renger et al. | | 709/217 |
| 2008/0086476 A1* | 4/2008 | Shrader et al. | | 707/10 |
| 2008/0086484 A1* | 4/2008 | Darnell et al. | | 707/10 |
| 2008/0086755 A1* | 4/2008 | Darnell et al. | | 725/105 |

(Continued)

*Primary Examiner* — Backhean Tiv
(74) *Attorney, Agent, or Firm* — Lee Law, PLLC; Christopher B. Lee

(57) ABSTRACT

An incoming web feed received from a web feed document server is monitored for changes associated with a web feed document. A change associated with the web feed document is determined to have occurred. A priority is assigned to the change associated with the web feed document based upon a ranking criterion. The change associated with the web feed document is stored with the assigned priority to a memory. This abstract is not to be considered limiting, since other embodiments may deviate from the features described in this abstract.

22 Claims, 5 Drawing Sheets

(56) References Cited

U.S. PATENT DOCUMENTS

| | | | |
|---|---|---|---|
| 2008/0126476 A1* | 5/2008 | Nicholas et al. | 709/203 |
| 2008/0140720 A1* | 6/2008 | Six et al. | 707/104.1 |
| 2008/0155112 A1* | 6/2008 | Ma et al. | 709/231 |
| 2008/0155118 A1* | 6/2008 | Glaser et al. | 709/238 |
| 2008/0307053 A1* | 12/2008 | Mitnick et al. | 709/205 |
| 2009/0006388 A1* | 1/2009 | Ives et al. | 707/5 |
| 2009/0042549 A1* | 2/2009 | Lee | 455/414.4 |
| 2009/0063646 A1* | 3/2009 | Mitnick | 709/206 |
| 2009/0138477 A1* | 5/2009 | Piira et al. | 707/10 |
| 2009/0171930 A1* | 7/2009 | Vaughan et al. | 707/5 |
| 2009/0307344 A1* | 12/2009 | Kaplan et al. | 709/224 |
| 2009/0319484 A1* | 12/2009 | Golbandi et al. | 707/3 |
| 2009/0327245 A1* | 12/2009 | Wong et al. | 707/3 |
| 2010/0050098 A1* | 2/2010 | Turner | 715/763 |
| 2010/0083124 A1* | 4/2010 | Druzgalski et al. | 715/738 |
| 2010/0100537 A1* | 4/2010 | Druzgalski et al. | 707/713 |
| 2010/0100607 A1* | 4/2010 | Scholz et al. | 709/219 |
| 2010/0100845 A1* | 4/2010 | Khan et al. | 715/810 |
| 2010/0191609 A1* | 7/2010 | Hodgetts et al. | 705/26 |
| 2010/0241964 A1* | 9/2010 | Belinsky et al. | 715/738 |
| 2010/0263027 A1* | 10/2010 | Yin et al. | 726/4 |
| 2010/0274889 A1* | 10/2010 | Carter et al. | 709/224 |
| 2011/0276396 A1* | 11/2011 | Rathod | 705/14.49 |

* cited by examiner

AUTOMATED FEED READER INDEXING

BACKGROUND OF THE INVENTION

1. Field of the Invention

The present invention relates to systems and methods for processing multiple web feeds received from a web feed document server. More particularly, the present invention relates to automated feed reader indexing.

2. Related Art

Information, such as news, sports, or other information, may be distributed by publishers of the information using web feeds, such as really simple syndication (RSS) web feeds. Users of consumer electronics devices may subscribe to web feeds of interest. Once subscribed, the users receive updated information distributed from web feed servers in the form of web feed documents. This updated information includes both significant changes and minor textual changes to the information associated with the subscribed web feed. If a user is subscribed to multiple web feeds, the user may receive multiple updates to information associated with the multiple subscribed web feeds.

BRIEF SUMMARY OF THE INVENTION

The subject matter described herein provides automated feed reader indexing for customized navigation of web feeds. An incoming web feed received from a web feed document server is monitored for changes associated with a web feed at either a consumer electronics device or a server. A determination is made as to whether a change associated with the web feed has occurred. A priority is assigned to the change based upon at least one ranking criterion. The change is stored with the assigned priority to a memory. Ranking criteria may be stored and retrieved as a portion of a static or dynamic web feed change ranking profile. The web feed change ranking profiles may include semantic, structural, and relevance ranking criteria. Additionally, metadata associated with the web feed may include ranking criteria, such as an author change rating. External services may be employed to interpret changes based upon the defined ranking criteria. The automated feed reader indexing may be displayed and highlighted to provide the user with an automated indexed, ranked, and prioritized web feed reader interface.

A method includes monitoring an incoming web feed received from a web feed document server for changes associated with a web feed document; determining that at least one change associated with the web feed document has occurred; assigning a priority to the at least one change associated with the web feed document based upon at least one ranking criterion; and storing the at least one change associated with the web feed document with the assigned priority to a memory.

A system includes a memory; and a processor programmed to: monitor an incoming web feed received from a web feed document server for changes associated with a web feed document; determine that at least one change associated with the web feed document has occurred; assign a priority to the at least one change associated with the web feed document based upon at least one ranking criterion; and store the at least one change associated with the web feed document with the assigned priority to the memory.

An alternative system includes a memory; a display; and a processor programmed to: monitor an incoming web feed received from a web feed document server for changes associated with a web feed document; receive, via the incoming web feed, the web feed document from the web feed document server; receive metadata comprising at least one of an author change rating and a publisher change rating from the web feed document server; compare the received web feed document with a stored version of the web feed document previously received from the web feed document server; identify the at least one change associated with the received web feed document relative to the stored version of the web feed document previously received from the web feed document server; retrieve a web feed change ranking profile comprising at least one ranking criterion from the memory; analyze the at least one change associated with the web feed document based upon the web feed change ranking profile; query a remote server for information useable to interpret the at least one change associated with the web feed document; receive the information useable to interpret the at least one change associated with the web feed document; determine a priority for the at least one change associated with the web feed document based upon at least one of the web feed change ranking profile, the received metadata, and the received information; assign the determined priority to the at least one change associated with the web feed document; store the at least one change associated with the web feed document with the assigned priority to the memory; and display the at least one change associated with the web feed document with the assigned priority on the display.

A computer program product includes a computer useable medium comprising a computer readable program. The computer readable program when executed on a computer causes the computer to monitor an incoming web feed received from a web feed document server for changes associated with a web feed document; determine that at least one change associated with the web feed document has occurred; assign a priority to the at least one change associated with the web feed document based upon at least one ranking criterion; and store the at least one change associated with the web feed document with the assigned priority to the memory.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

An incoming web feed received from a web feed document server is monitored for changes associated with a web feed at either a consumer electronics device or a server. A determination is made as to whether a change associated with the web feed has occurred. A priority is assigned to the change based upon at least one ranking criterion. The change is stored with the assigned priority to a memory. Ranking criteria may be stored and retrieved as a portion of a static or dynamic web feed change ranking profile. The web feed change ranking profiles may include semantic, structural, and relevance ranking criteria. Additionally, metadata associated with the web feed may include ranking criteria, such as an author change rating. External services may be employed to interpret changes based upon the defined ranking criteria. The automated feed reader indexing may be displayed and highlighted to provide the user with an automated indexed, ranked, and prioritized web feed reader interface.

The automated feed reader indexing described herein may be performed in real time to allow prompt indexing, prioritizing, and ranking of changes associated with incoming web feed content. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a portion of a second or within a few seconds). These terms, while difficult to precisely define, are well understood by those skilled in the art.

Figure 1:
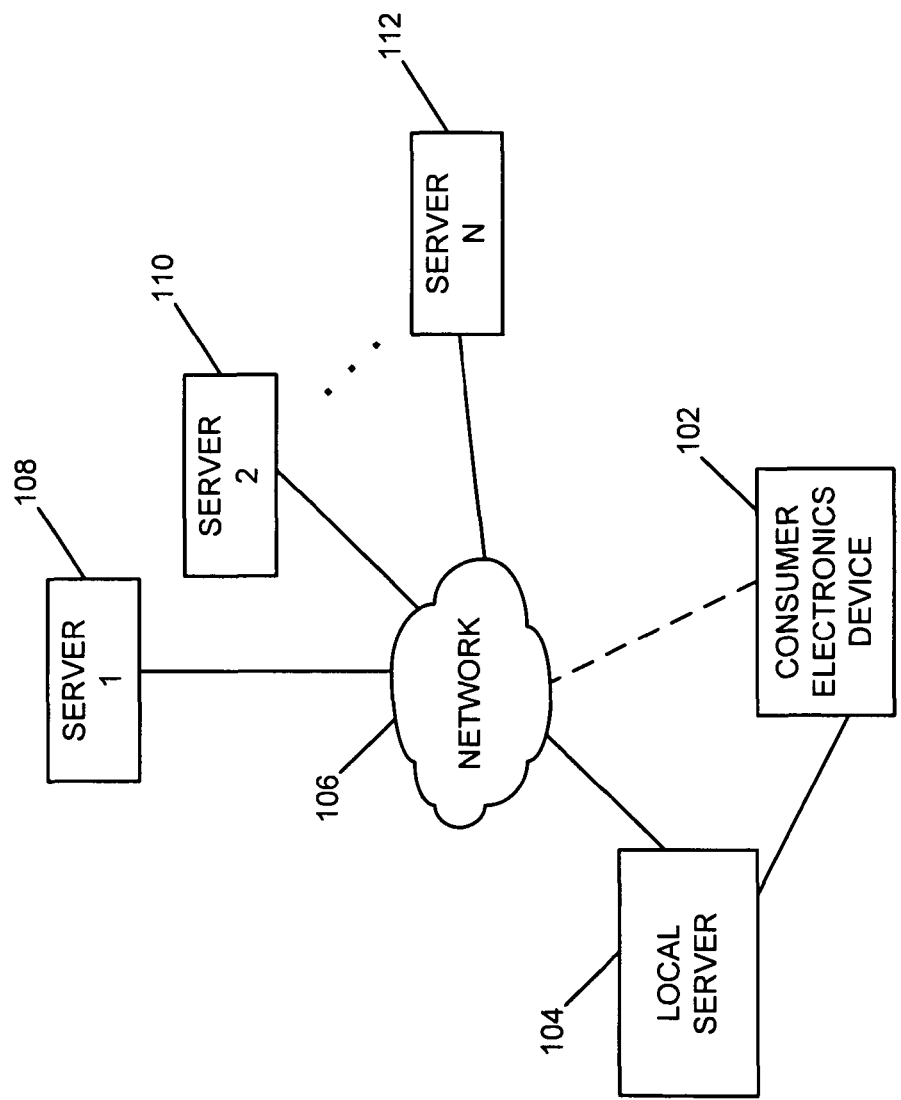
FIG. 1 is a block diagram of an example of an implementation of a system for automated feed reader indexing according to an embodiment of the present subject matter.

FIG. 1 is a block diagram of an example of an implementation of a system 100 for automated feed reader indexing. A consumer electronics device 102 is shown interconnected with a local server 104. The consumer electronics device 102 and the local server 104 may each provide the automated feed reader indexing by monitoring incoming web feeds for changes and ranking identified changes for presentation to a user of the consumer electronics device 102. As will be described in more detail below in association with FIGS. 2 through 5, the consumer electronics device 102 or the local server 104 may provide the automated feed reader indexing based upon ranking criteria. The ranking criteria may include semantic ranking criteria, structural ranking criteria, and relevance ranking criteria. The ranking criteria may further be associated with and stored as a portion of a web feed change ranking profile. The web feed change ranking profile may be static and supplied in association with the consumer electronics device 102. Additionally, the web feed change ranking profile may be dynamic and may be created and/or modified based upon information supplied for use in association with the profile by a user via the consumer electronics device 102. As such, the term web feed change ranking profile and related terminology will be used throughout this description to refer to either a static or a dynamic web feed change ranking profile.

It should be noted that the consumer electronics device 102 may be a portable computing device, either by a user's ability to move the consumer electronics device 102 to different locations or by the consumer electronics device 102's association with a portable platform, such as a plane, train, automobile, or other moving vehicle. Accordingly, the consumer electronics device 102 or the local server 104 may include capabilities that allow the user to create the web feed change ranking profiles to incorporate location as an option for ranking web feed content. As such, the consumer electronics device 102 may identify a location associated with the consumer electronics device 102 based upon global positioning system (GPS), network interconnectivity such as via the local server 104, or other suitable approach and ranking of web feed content changes may be performed based upon the identified location. Similarly, the local server 104 may include capabilities to identify a location of the local server 104, such as via GPS, and may also have static or dynamic profile-based ranking criteria that allow filtering or alternative prioritizing of changes to web feed documents based upon the location of the local server 104.

For example, if the consumer electronics device 102 is being used by the user in a work environment, the automated feed reader indexing may be tailored to prioritize work-related web feeds and de-prioritize web feeds of personal interest to the user. Additionally, if the consumer electronics device 102 is being used by the user in a home environment, the automated feed reader indexing may be tailored to prioritize home-related web feeds and de-prioritize web feeds of work interest to the user. The determination regarding the operating environment of the consumer electronics device 102 may be made either by the consumer electronics device 102 or by the local server 104. Accordingly, location-based ranking of automated feed reader indexing may be generated and processed via either the consumer electronics device 102 or the local server 104 to control, regulate, and prioritize content delivered to the consumer electronics device 102.

It should also be noted that the consumer electronics device 102 may be any computing device capable of processing information as described above and in more detail below. For example, the consumer electronics device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

It should additionally be noted that the local server 104 may be an optional component in any given implementation of the present subject matter. As such, the consumer electronics device 102 may interconnect either via the local server 104 or via a network 106 with a server_1 108, a server_2 110, through a server_N 112. As such, a dashed-line is illustrated between the consumer electronics device 102 and the network 106 to represent the optional interconnection. The network 106 includes any form of interconnection suitable for the intended purpose, including a private or public network such as an intranet or the Internet, respectively, direct inter-module interconnection, dial-up, or any other interconnection mechanism capable of interconnecting the devices within the system 100. The server_1 108 through the server_N 112 provide web content in the form of web feeds, such as really simple syndication (RSS) web feeds, that may be subscribed to and received by the consumer electronics device 102. As such, the server_1 108 through the server_N 112 represent web servers and web feed content servers for purposes of the present description.

While the present description of automated feed reader indexing is described in association with the consumer electronics device 102 and the local server 104, it is understood that the subject matter described may be performed at other devices within the system 100, such as the server_1 108 through the server_N 112, without departure from the scope of the present subject matter. For example, information, such as a web feed change ranking profile or a location of the consumer electronics device 102 may be communicated to the respective server device for processing and the automated feed reader indexing may be performed at the respective server and a ranking may be communicated to the consumer electronics device 102 along with or in addition to a change to a web feed document. This ranking information may be communicated to the consumer electronics device 102 as metadata along with any author change ranking or other information suitable for use in association with the present subject matter.

Figure 2:
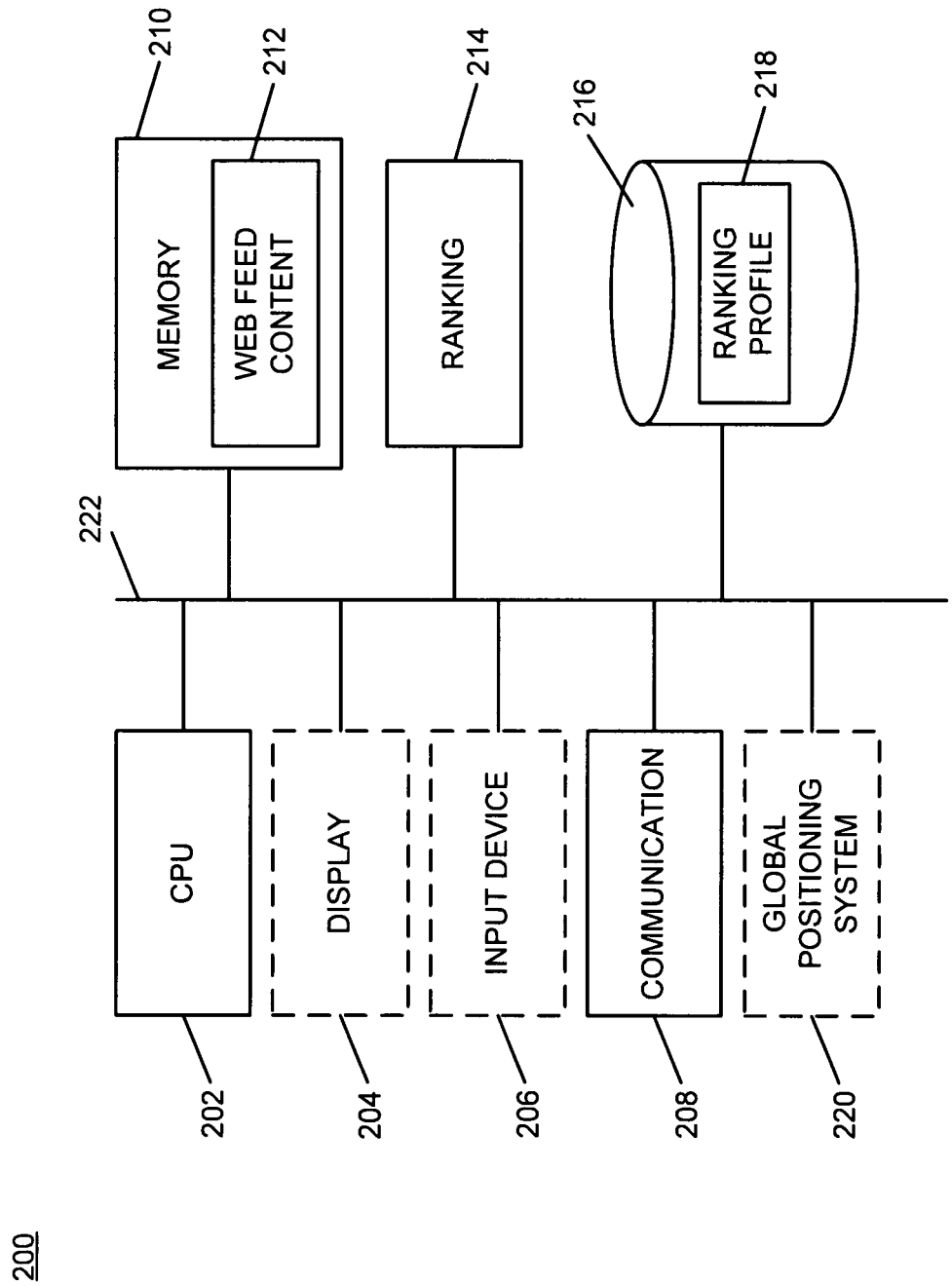
FIG. 2 is a block diagram of an example of an implementation of a core processing module that is capable of performing automated feed reader indexing based upon ranking criteria according to an embodiment of the present subject matter.

FIG. 2 is a block diagram of an example of an implementation of the core processing module 200 that is capable of performing automated feed reader indexing based upon ranking criteria. The ranking criteria may be defined either statically or may be defined dynamically by a user via the consumer electronics device 102 or by an administrator of a server device, such as the local server 104, and may be associated with a web feed change ranking profile, as described in more detail below.

It is understood that the core processing module 200 or a similar module may be implemented for each of the consumer electronics device 102, the local server 104, and at any of the server_1 108 through the server_N 112. For brevity, the core processing module 200 will be described generally. However, the description of the core processing module 200 shall be considered applicable to each of the consumer electronics device 102, the local server 104, and any of the server_1 108 through the server_N 112, as appropriate. Differences may also exist for a given implementation of the consumer electronics device 102, the local server 104, and any of the server_1 108 through the server_N 112 and all are considered within the scope of the present subject matter.

A central processing unit (CPU) 202 provides computer instruction execution, computation, and other capabilities within the core processing module 200. A display 204 provides visual information to a user of a device, such as the consumer electronics device 102 or the local server 104, and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for devices, such as the local server 104, or any of the server_1 108 through the server_N 112. Accordingly, the local server 104, and any of the server_1 108 through the server_N 112 may operate as a completely automated embedded device without user configurability or feedback. However, devices, such as the consumer electronics device 102 may provide user feedback and configurability via the display 204 and the input device 206, respectively.

A communication module 208 provides interconnection capabilities that allow the core processing module 200 to communicate with other modules within the system 100, such as the local server 104, and any of the server_1 108 through the server_N 112, to receive web feeds and web feed content. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 includes any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may also include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a web feed content storage area 212 that stores web feed content received by the core processing module 200. The web feed content storage area 212 stores previously received versions of web feed documents and incoming web feed documents associated with the same web feed sources, such as the local server 104, or any of the server_1 108 through the server_N 112. As will be described in more detail below, the previously received web feed content stored within the web feed content storage area 212 is compared with incoming web feed documents to identify changes associated with the web feed document.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A ranking module 214 provides the automated feed reader indexing based upon ranking criteria and comparison of previously received web feed documents with incoming web feed documents within the core processing module 200. A database 216 is associated with the core processing module 200 and provides storage capabilities for information associated with the automated feed reader indexing. The database 216 includes a ranking profile storage area 218 that may be stored in the form of tables or other arrangements accessible by the consumer electronics device 102. The ranking profile storage area 218 is used to store web feed change ranking criteria, such as semantic ranking criteria, structural ranking criteria, and relevance ranking criteria.

As will be described in more detail below, the semantic ranking criteria may include criteria for determining a difference in meaning between two versions of words. For example, a change such as a word change in a received web feed from "a" to "the" may be analyzed and quantified as a minor semantic change. Conversely, a change to a calendar lunch feed change from "Italian restaurant" to "Italian Bistro" may be analyzed and quantified as a more important semantic change because, for example, the change may suggest a different place that a group is meeting for lunch. It should also be noted that external sources, as described in more detail below, may be employed to assist with analysis of semantic changes, such as web servers for determining a location of the "Italian Bistro."

Structural ranking criteria may include criteria for determining an amount of content added or removed from a changed web feed document. Thresholds may be set for prioritizing a large amount of content change over a lesser amount of content change. Structural ranking criteria may also include grammatical and formatting changes to documents.

Relevance ranking criteria may include keywords or other identifiers relevant to a domain of interest. For example, ranking may be performed based upon relevance of article's domain, user's domain, or other keywords. As such, changes to a work domain of "software" may be ranked differently than changes to a non-work domain of "dogs." As another example of possible relevance ranking criteria, if a user elects to subscribe via the consumer electronics device 102 to a web feed associated with mortgage rates, a change from nine percent (9%) to two percent (2%) may be ranked higher than changes such as semantic changes. As yet another example of possible relevance ranking criteria, if a user of the consumer electronics device 102 is planning to sit for an examination, such as a certification examination, and a subscribed web feed has a change in a date of the examination, this change may be ranked higher than changes such as date changes within other web feeds by use of relevance ranking criteria.

Additionally, these ranking criteria may be combined with conventional ranking criteria, such as modification data and other statistical measures. Further, these ranking criteria may be combined with one another based upon user preferences as stored within a web feed change ranking profile via user interaction with the consumer electronics device 102. The ranking criteria may also vary based upon a location of the consumer electronics device 102 or the server 104 by use of location-based ranking criteria within a web feed change ranking profile. Accordingly, re-ranking may occur, for example, based upon a change of location of the consumer electronics device 102 from a home environment to a work environment. In such a situation, a ranking assigned during working hours may be changed for the user of the consumer electronics device 102 for hobby and other pursuits of interest while at home. Similarly, work-based re-ranking may be implemented again upon arrival at work. While the examples above illustrate certain possibilities for ranking changes to web feed documents, many other possibilities exist for use of ranking profiles for automated feed reader indexing and all are considered within the scope of the present subject matter.

Returning to the description of the core processing module 200, a global positioning system (GPS) module 220 provides positioning location coordinates usable for identifying a physical location of the consumer electronics device 102 or the local server 104. Based upon the positioning location coordinates provided by the GPS module 220, the ranking module 214 may further refine the automated feed reader indexing based upon a location of the consumer electronics device 102 or based upon a location of the local server 104.

As with the display 204 and the input device 206, the GPS module 220 is illustrated with a dashed-line representation within FIG. 2 to indicate that it is an optional component for devices, such as the local server 104, and any of the server_1 108 through the server_N 112. Accordingly, the local server 104, and the server_1 108 through the server_N 112 may not provide location coordinates for use in association with the present subject matter. In such a situation, location information may be statically or dynamically provided in association with a web feed change ranking profile for a given device. However, the consumer electronics device 102 may provide location coordinates via the GPS module 220 to facilitate additional feed reader indexing and filtering, as described in more detail below.

It should be noted that though the ranking module 214 and the GPS module 220 are illustrated as component-level modules for ease of illustration and description purposes, it should be noted that the ranking module 214 and the GPS module 220 include any hardware, programmed processor(s), and memory used to carry out the respective functions of the ranking module 214 and the GPS module 220 as described above and in more detail below. For example, the ranking module 214 and the GPS module 220 may include additional controller circuitry in the form of application specific integrated circuits (ASICs), processors, antennas, and/or discrete integrated circuits and components for performing communication and electrical control activities associated with the ranking module 214 and the GPS module 220. Additionally, the ranking module 214 and the GPS module 220 may also include interrupt-level, stack-level, and application-level modules as appropriate. Furthermore, the ranking module 214 and the GPS module 220 may include any memory components used for storage, execution, and data processing for performing the respective processing activities associated with the modules. The ranking module 214 and the GPS module 220 may also form a portion of other circuitry described without departure from the scope of the present subject matter.

The CPU 202, the display 204, the input device 206, the communication module 208, the memory 210, the ranking module 214, the database 216, and the GPS module 220 are interconnected via an interconnection 222. The interconnection 222 may include a system bus, a network, or any other interconnection capable of providing the respective components with suitable interconnection for the respective purpose.

While the consumer electronics device 102 and the local server 104 are illustrated with and have certain components described, other modules and components may be associated with the consumer electronics device 102 or the local server 104 without departure from the scope of the present subject matter. Additionally, it should be noted that, while the consumer electronics device 102 and the local server 104 are described as single devices for ease of illustration purposes, the components within the consumer electronics device 102 or the local server 104 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the consumer electronics device 102 are possible and all are considered within the scope of the present subject matter. It should also be understood that, though the ranking profile storage area 218 is shown within the database 216, the ranking profile storage area 218 may also be stored within the memory 210 without departure from the scope of the present subject matter. Accordingly, the consumer electronics device 102 and the local server 104 may take many forms and may be associated with many platforms.

Figure 3:
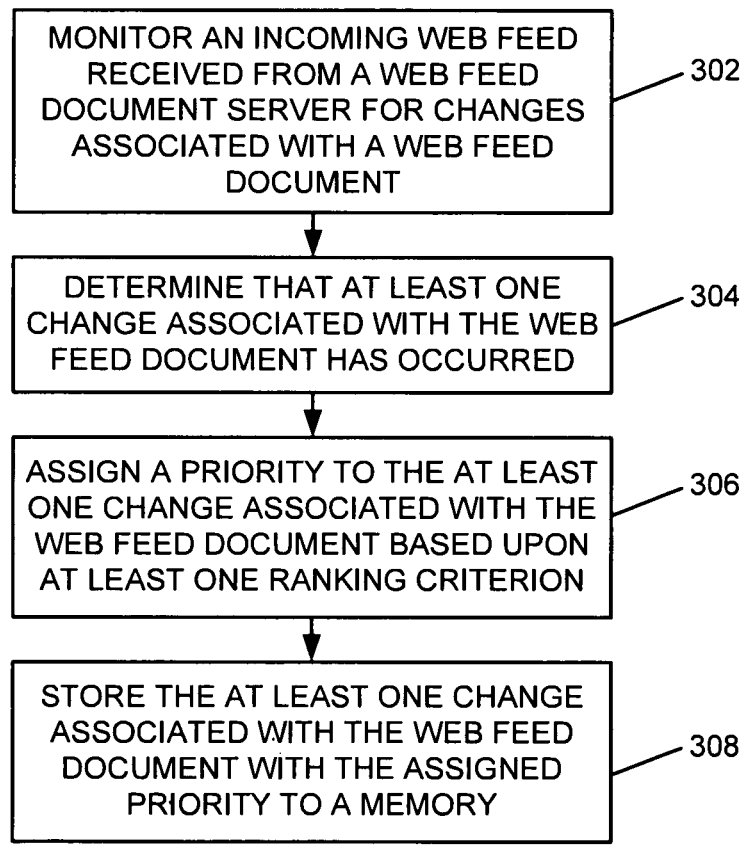
FIG. 3 is a flow chart of an example of an implementation of a process that provides automated feed reader indexing for a consumer electronics device according to an embodiment of the present subject matter.
Figure 4:
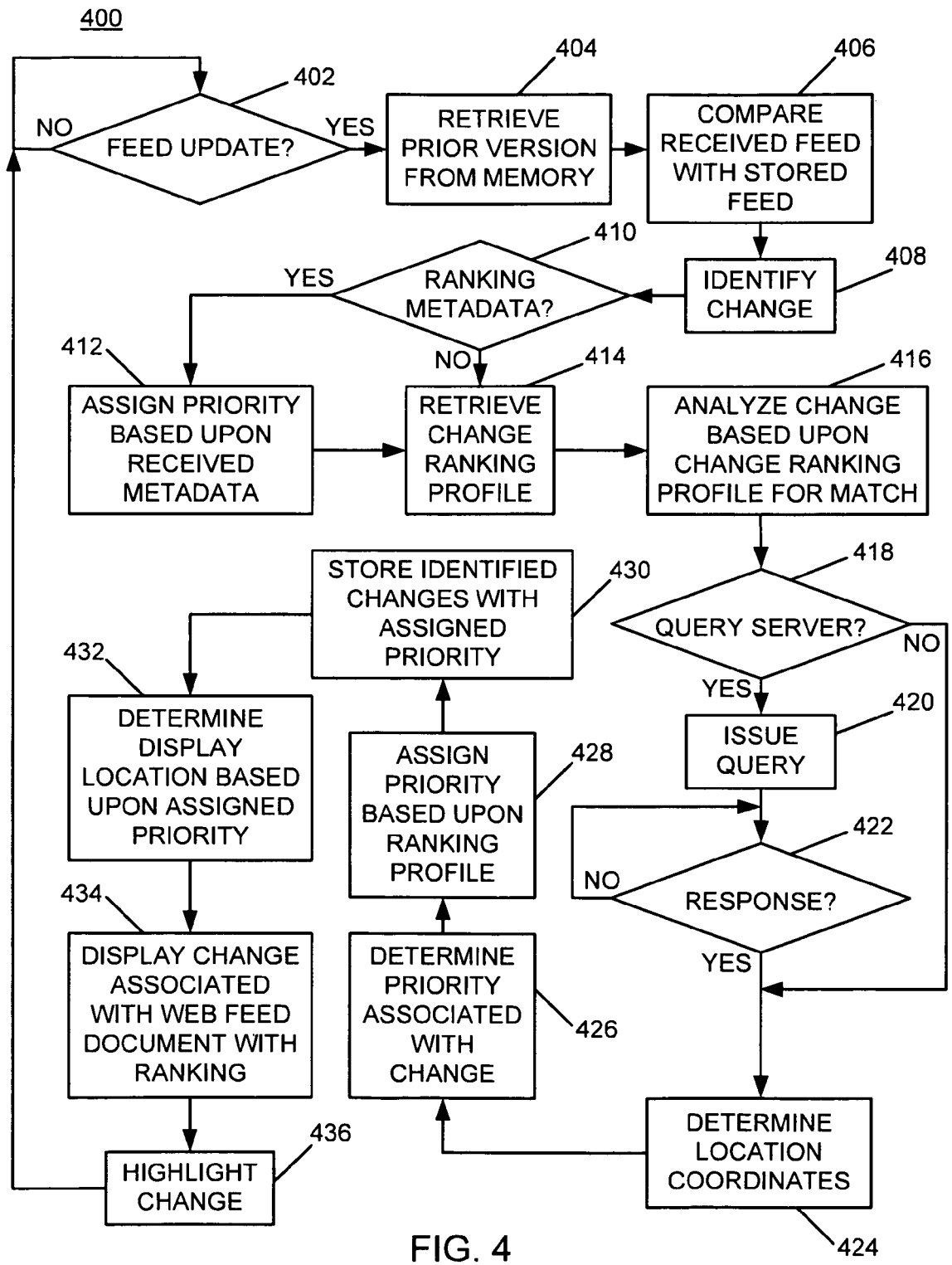
FIG. 4 is a flow chart of an example of an implementation of a process that provides automated feed reader indexing for a consumer electronics device based upon metadata received in association with web feed documents updates, web feed change ranking profiles, and queries of remote resources for information useable to interpret changes to web feed documents according to an embodiment of the present subject matter.

FIG. 3 and FIG. 4 below describe example processes that may be executed by devices, such as the consumer electronics device 102 or the local server 104, to perform the automated feed reader indexing associated with the present subject matter. Many other variations on the example processes are possible and all are considered within the scope of the present subject matter. The example processes may be performed by modules, such as the ranking module 214 and/or executed by the CPU 202, associated with the core processing module 200 of such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 that provides automated feed reader indexing for devices, such as the consumer electronics device 102 and the local server 104. At block 302, the process 300 monitors an incoming web feed received from a web feed document server for changes associated with a web feed document. At block 304, the process 300 determines that at least one change associated with the web feed document has occurred. At block 306, the process 300 assigns a priority to the at least one change associated with the web feed document based upon at least one ranking criterion. At block 308, the process 300 stores the at least one change associated with the web feed document with the assigned priority to a memory.

FIG. 4 is a flow chart of an example of an implementation of a process 400 that provides automated feed reader indexing for a consumer electronics device, such as the consumer electronics device 102, based upon metadata received in association with web feed document updates, web feed change ranking profiles, and queries of remote resources for information useable to interpret changes to web feed documents. The example process 400 assumes that a received feed update includes at least one change associated with the respective web feed. At decision point 402, the process 400 monitors an incoming web feed for an update (e.g., change) associated with a web feed document to be received from a web feed document server, such as one of the server 1 108 through the server_N 112, via the web feed. Upon receipt of a web feed document update, the process 400 retrieves a stored version of the web feed document previously received from the web feed document server from memory, such as the web feed content storage area 212 within the memory 210, at block 404. At block 406, the process 400 compares the received web feed document with the stored web feed document. At block 408, the process 400 identifies at least one change associated with the received web feed document relative to the stored version of the web feed document previously received from the web feed document server.

At decision point 410, the process 400 makes a determination as to whether any ranking criteria metadata was received from the web feed document server in association with the web feed document update. As described above, the metadata may include ranking criteria, such as an author change rating, a publisher change rating, or other metadata defined in association with the web feed document. When a determination is made that ranking criteria metadata was received in association with the web feed document update, the process 400 assigns a priority for the update based upon the received ranking criteria metadata to rank the update associated with the web feed document based upon the received metadata at block 412. It should be noted that the present example assigns the priority for the update based upon the received ranking criteria metadata as an initial priority for the web feed document update and that this priority may be further adjusted as described in more detail below.

When a determination is made that ranking criteria metadata was not received in association with the web feed document update or upon assigning a priority associated with the received ranking criteria metadata, the process 400 retrieves a web feed change ranking profile from a memory, such as from the ranking profile storage area 218 within the database 216, at block 414. The retrieved web feed change ranking profile may include, for example, at least one of semantic ranking criteria, structural ranking criteria, and relevance ranking criteria. These criteria may be user-defined via user interaction with a user interface of a device, such as the consumer electronics device 102.

At block 416, the process 400 analyzes the change associated with the web feed document based upon the retrieved web feed change ranking profile for a match. This analysis may be based upon any retrieved web feed change ranking profile and any semantic ranking criteria, structural ranking criteria, and relevance ranking criteria. As an example of semantic ranking criteria, antonyms may be given more weight than synonyms. Alternatively, differences in a meaning of a word in the prior version of the web feed document and a word used in the update to replace the prior word may be considered. As an example of structural ranking criteria, a larger quantity of content added or removed may be given more weight than changes to words or grammar. As an example of relevance ranking criteria, ranking may be based upon relevance of a change to an article's domain, a user's domain, and specific keywords, all stored in association with the web feed change ranking profile as defined by the user via the consumer electronics device 102. As such, an item from a source associated with operating systems may be given more weight than a change associated with pet food.

The semantic ranking criteria, structural ranking criteria, and relevance ranking criteria may be tailored via the consumer electronics device 102 to allow the user to personalize the change notification. Additionally, the weighting from multiple profile categories may be combined with traditional statistics, such as modification date, number of words changed, and other related information to provide an enhanced perspective relative to the traditional statistics.

At decision point 418, the process 400 makes a determination as to whether to query an external resource, such as one of the server_1 108 through the server_N 112, for information useable to rank the change associated with the web feed document. For example, as described above, if the change associated with the web feed document is to a feed for a work team calendar and the change is from "Italian Lunch" to "Italian Bistro," the process 400 may determine that use of an external resource may be helpful in determining how to prioritize this change.

When a determination is made to query an external resource for information useable to interpret the change, the process 400 issues a query at block 420. The query may be formed in any suitable format for a given system. Many messaging formats are available for a variety of inter-system communications and all are considered within the scope of the present subject matter.

The process 400 waits for a response to the issued query at decision point 422. Upon receipt of a response or upon determining not to query an external resource for information useable to interpret the change, the process 400 determines location coordinates for the consumer electronics device 102 at block 424. The location coordinates may be determined using the GPS module 220 described above. Use of coordinates for the consumer electronics device 102 allows for ranking to be tailored based upon the determined location. Location matching criteria may also be associated with the retrieved web feed change ranking profile to allow tailoring of priorities between alternate locations, such as work and home usage, of the consumer electronics device 102. As described above, if the consumer electronics device 102 is being used by the user in a work environment, the automated feed reader indexing may be tailored to prioritize work-related web feeds and de-prioritize web feeds of personal interest to the user. Additionally, if the consumer electronics device 102 is being used by the user in a home environment, the automated feed reader indexing may be tailored to prioritize home-related web feeds and de-prioritize web feeds of work interest to the user.

At block 426, the process 400 determines a priority associated with the change associated with the web feed document based upon interpretation of the web feed change ranking profile analysis combined with any received information useable to interpret the change and a location of the consumer electronics device 102.

At block 428, the process 400 assigns a priority based upon the interpretation of the web feed change ranking profile analysis combined with any received query results and any assigned priority based upon any received metadata. It should be noted that this priority ranking, in combination with any assigned priority based upon received metadata, may be different from a priority assigned based upon any received metadata described above. At block 430, the identified change is stored with the assigned priority to a memory, such as the web feed content storage area 212.

At block 432, the process 400 determines a display location for presentation of the change to the web feed document based upon the assigned combined ranking. For example, higher priority changes may be displayed on the display 204 at a location higher than lower priority changes. Additionally, the process 400 may sort the web feed document within a set of web feed documents based upon the assigned priority on the display 204. Many possibilities exist for varying a display location based upon an assigned ranking and all are considered within the scope of the present subject matter.

At block 434, the process 400 displays the change associated with the assigned web feed document ranking. At block 436, the process 400 highlights the change associated with the web feed document on the display 204. For example, the process 400 may highlight the change in varying colors or textures based upon the assigned ranking. Many other forms of highlighting are possible and all are considered within the scope of the present subject matter. The process 400 then returns to decision point 402 to monitor the incoming web feed for another update.

Accordingly, the process 400 provides an example of one possible approach to automated feed reader indexing at a device, such as the consumer electronics device 102. The example process 400 is based upon a combination of metadata received in association with web feed documents updates, web feed change ranking profiles, and queries of remote resources for information useable to interpret changes to web feed documents. Individual processes for each of the respective ranking approaches may be formulated and additional variations are possible and all are considered within the scope of the present subject matter.

Figure 5:
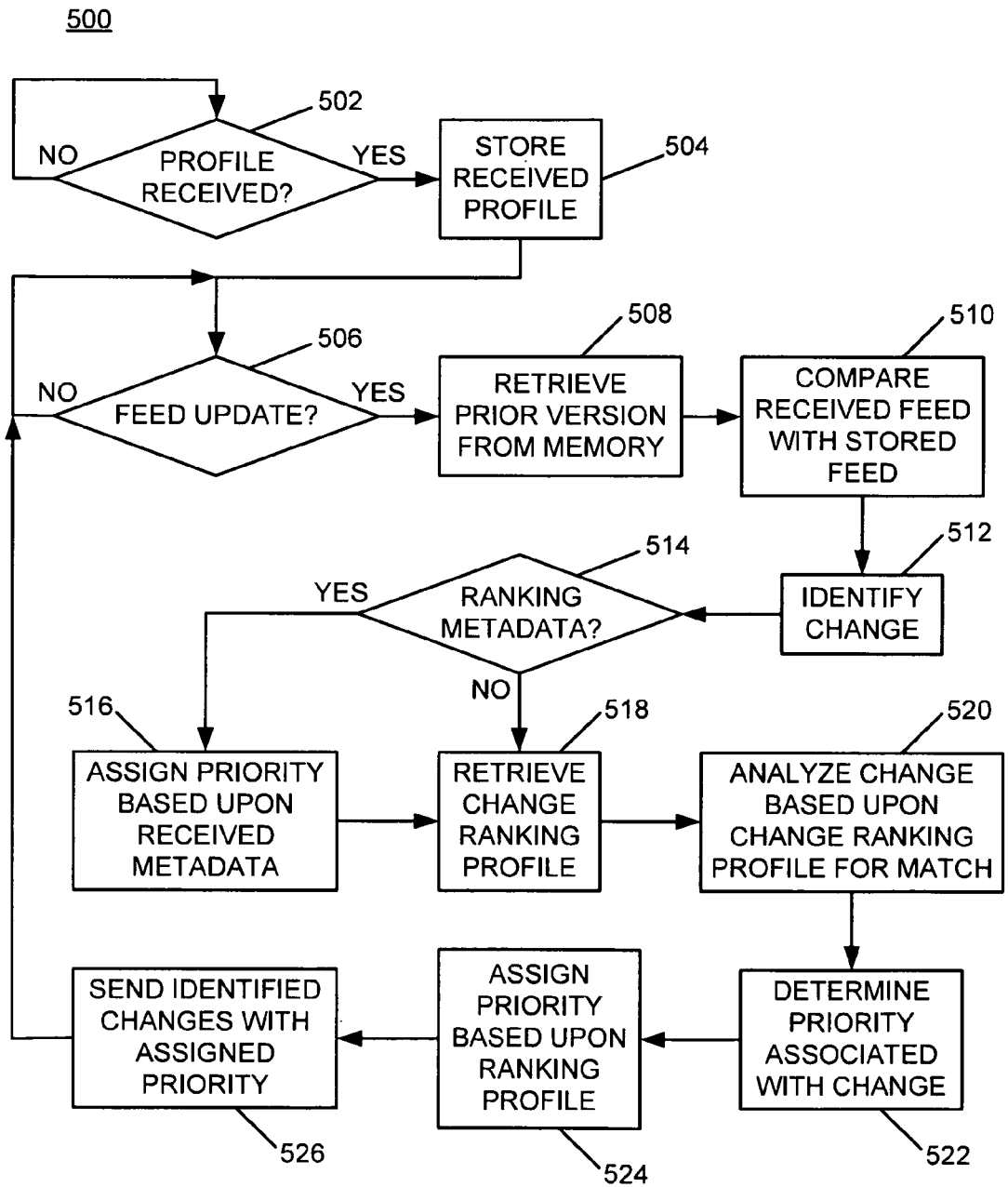
FIG. 5 is a flow chart of an example of an implementation of a process that provides automated feed reader indexing at a server device based upon metadata received in association with web feed document updates and web feed change ranking profiles according to an embodiment of the present subject matter.

FIG. 5 is a flow chart of an example of an implementation of a process 500 that provides automated feed reader indexing at a server device, such as the local server 104, based upon metadata received in association with web feed document updates and web feed change ranking profiles. It should be noted that while the process 500 does not illustrate processing for querying a remote source for information useable to interpret changes to web feed documents or determining location coordinates, such processing may be associated with processing at the local server 104 without departure from the scope of the present subject matter. FIG. 4 illustrates an example of processing for such a query and determining location coordinates. As with the process 400 described in association with FIG. 4 above, the example process 500 assumes that a received feed update includes at least one change associated with the respective web feed.

At decision point 502, the process 500 awaits receipt of a web feed change ranking profile including ranking criteria, such as semantic, structural, relevance, and location ranking criteria. The web feed change ranking profile may be received from the consumer electronics device 102 or may be received from a server administrator via a user interface of the local server 104.

Upon receipt of a web feed change ranking profile, the process 500 stores the received web feed ranking profile in a memory, such as the ranking profile storage area 218 within the database 216, at block 504. At decision point 506, the process 500 monitors an incoming web feed for an update (e.g., change) associated with a web feed document to be received from a web feed document server, such as one of the server_1 108 through the server_N 112, via the web feed. Upon receipt of a web feed document update, the process 500 retrieves a stored version of the web feed document previously received from the web feed document server from memory, such as the web feed content storage area 212 within the memory 210, at block 508. At block 510, the process 500 compares the received web feed document with the stored web feed document. At block 512, the process 500 identifies at least one change associated with the received web feed document relative to the stored version of the web feed document previously received from the web feed document server.

At decision point 514, the process 500 makes a determination as to whether any ranking criteria metadata was received from the web feed document server in association with the web feed document update. As described above, the metadata may include ranking criteria, such as an author change rating, a publisher change rating, or other metadata defined in association with the web feed document. When a determination is made that ranking criteria metadata was received in association with the web feed document update, the process 500 assigns a priority for the update based upon the received ranking criteria metadata to rank the update associated with the web feed document based upon the received metadata at block 516. It should be noted that the present example assigns the priority for the update based upon the received ranking criteria metadata as an initial priority for the web feed document update and that this priority may be further adjusted as described in more detail below.

When a determination is made that ranking criteria metadata was not received in association with the web feed document update or upon assigning a priority associated with the received ranking criteria metadata, the process 500 retrieves a web feed change ranking profile from a memory, such as from the ranking profile storage area 218 within the database 216, at block 518. As described above, the retrieved web feed change ranking profile may include, at least one of semantic ranking criteria, structural ranking criteria, relevance ranking criteria, and location ranking criteria. These criteria may be user-defined via user interaction with a user interface of a device, such as the consumer electronics device 102.

At block 520, the process 500 analyzes the change associated with the web feed document based upon the retrieved web feed change ranking profile for a match. This analysis may be based upon any retrieved web feed change ranking profile and any semantic ranking criteria, structural ranking criteria, relevance ranking criteria, and location ranking criteria associated with the web feed change ranking profile.

As described above, the semantic ranking criteria, structural ranking criteria, relevance ranking criteria, and location ranking criteria may be tailored via the consumer electronics device 102 to allow the user to personalize the change notification. Additionally, the weighting from multiple profile categories may be combined with traditional statistics, such as modification date, number of words changed, and other related information to provide an enhanced perspective relative to the traditional statistics.

At block 522, the process 500 determines a priority associated with the change associated with the web feed document based upon interpretation of the web feed change ranking profile analysis. At block 524, the process 500 assigns a priority based upon the interpretation of the web feed change ranking profile analysis combined with any assigned priority based upon any received metadata. It should be noted that this priority ranking, in combination with any assigned priority based upon received metadata, may be different from a priority assigned based upon any received metadata described above. At block 526, the process 500 sends the identified change with the assigned priority to the consumer electronics device 102. The sending of the identified change with the assigned priority may be initiated by sending the identified change with the assigned priority to a memory, such as the web feed content storage area 212 or an output buffer memory associated with the communications device 208. The process 500 then returns to decision point 502 to await another incoming web feed for an update associated with a web feed document to be received from a web feed document server. It should be noted that the process 500 may alternatively be configured to receive updates to profiles and additional processing in addition to waiting for new web feed updates and any such alternatives are considered within the scope of the present subject matter.

Accordingly, the process 500 provides an example of one possible approach to automated feed reader indexing at a device, such as the local server 104. The example process 500 is based upon a combination of metadata received in association with web feed documents updates, and web feed change ranking profiles. Individual processes for each of the respective ranking approaches may be formulated and additional variations are possible and all are considered within the scope of the present subject matter.

As described above in association with FIG. 1 through FIG. 5, the example systems and processes provide automated feed reader indexing. Many other variations and additional activities associated with automated feed reader indexing are possible and all are considered within the scope of the present subject matter.

Those skilled in the art will recognize, upon consideration of the above teachings, that certain of the above examples are based upon use of a programmed processor, such as the CPU 202. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable storage medium(s) may be utilized. The computer-usable or computer-readable storage medium may be, for example but not limited to, an electronic, magnetic, optical, electromagnetic, infrared, or semiconductor system, apparatus, or device medium. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   monitoring an incoming web feed received from a web feed document server for changes associated with a web feed document;
   determining, based upon the monitoring of the incoming web feed, that at least one change associated with the web feed document has occurred, where the at least one change associated with the web feed document comprises metadata comprising at least one of an author-defined change rating of the at least one change defined in association with the web feed document and a publisher-defined change rating of the at least one change defined in association with the web feed document received from the web feed document server in association with the at least one change associated with the web feed document;
   assigning a priority to rank the at least one change associated with the web feed document based upon a first location-based ranking criterion that specifies web feed change ranking for a first determined location of a user computing device and at least one user activity configured for the first location, and based upon the received metadata;
   storing the at least one change associated with the web feed document with the assigned priority to a memory; and
   re-ranking, in response to a change of the user computing device to a second location, the at least one change associated with the web feed document based upon a second location-based ranking criterion that specifies web feed change ranking for the second location of the computing device and at least one user activity configured for the second location.

2. The method of claim 1, where monitoring the incoming web feed received from the web feed document server for changes to the web feed document comprises:
   receiving, via the incoming web feed, the web feed document from the web feed document server; and
   comparing the received web feed document with a stored version of the web feed document previously received from the web feed document server; and
   where determining that the at least one change associated with the web feed document has occurred comprises identifying the at least one change associated with the received web feed document relative to the stored version of the web feed document previously received from the web feed document server.

3. The method of claim 1, where assigning the priority to rank the at least one change associated with the web feed document based upon the first location-based ranking criterion that specifies the web feed change ranking for the first determined location of the user computing device and the at least one user activity configured for the first location comprises:
   retrieving a web feed change ranking profile comprising the first location-based ranking criterion from the memory;
   analyzing the at least one change associated with the web feed document based upon the first location-based ranking criterion within the web feed change ranking profile, the first determined location, and the at least one user activity configured for the first location; and
   determining the priority assigned to the at least one change associated with the web feed document based upon the first location-based ranking criterion within the web feed change ranking profile, the first determined location, and the at least one user activity configured for the first location.

4. The method of claim 3, where:
the web feed change ranking profile further comprises at least one of a semantic ranking criterion, a structural ranking criterion, and a relevance ranking criterion;
determining the priority assigned to the at least one change associated with the web feed document based upon the first location-based ranking criterion within the web feed change ranking profile, the first determined location, and the at least one user activity configured for the first location comprises retrieving location coordinates of the first location from a global positioning system (GPS) module and determining whether the retrieved location coordinates match the location-based ranking criterion; and
further comprising determining whether the at least one change associated with the web feed document matches at least one of the semantic ranking criterion, the structural ranking criterion, and the relevance ranking criterion.

5. The method of claim 1, where assigning the priority to rank the at least one change associated with the web feed document based upon the first location-based ranking criterion that specifies the web feed change ranking for the first determined location of the user computing device and the at least one user activity configured for the first location comprises:
querying a remote server for information useable to interpret the at least one change associated with the web feed document;
receiving the information useable to interpret the at least one change associated with the web feed document; and
assigning the priority to the at least one change associated with the web feed document based upon the received information.

6. The method of claim 1, further comprising:
displaying the at least one change associated with the web feed document with the assigned priority to a user via a display associated with a consumer electronics device;
displaying the assigned priority in a location associated with the at least one change associated with the web feed document on the display;
sorting the web feed document within a set of web feed documents based upon the assigned priority on the display; and
highlighting the at least one change associated with the web feed document on the display.

7. The method of claim 1, where storing the at least one change associated with the web feed document with the assigned priority to the memory comprises storing the at least one change associated with the web feed document with the assigned priority to an output buffer and sending the at least one change associated with the web feed document with the assigned priority to a consumer electronics device.

8. A system, comprising:
a memory; and
a processor programmed to:
monitor an incoming web feed received from a web feed document server for changes associated with a web feed document;
determine, based upon the monitoring of the incoming web feed, that at least one change associated with the web feed document has occurred, where the at least one change associated with the web feed document comprises metadata comprising at least one of an author-defined change rating of the at least one change defined in association with the web feed document and a publisher-defined change rating of the at least one change defined in association with the web feed document received from the web feed document server in association with the at least one change associated with the web feed document;
assign a priority to rank the at least one change associated with the web feed document based upon a first location-based ranking criterion that specifies web feed change ranking for a first determined location of a user computing device and at least one user activity configured for the first location, and based upon the received metadata;
store the at least one change associated with the web feed document with the assigned priority to the memory; and
re-rank, in response to a change of the user computing device to a second location, the at least one change associated with the web feed document based upon a second location-based ranking criterion that specifies web feed change ranking for the second location of the computing device and at least one user activity configured for the second location.

9. The system of claim 8, where in being programmed to monitor the incoming web feed received from the web feed document server for changes to the web feed document, the processor is programmed to:
receive, via the incoming web feed, the web feed document from the web feed document server; and
compare the received web feed document with a stored version of the web feed document previously received from the web feed document server; and
where in being programmed to determine that the at least one change associated with the web feed document has occurred, the processor is programmed to identify the at least one change associated with the received web feed document relative to the stored version of the web feed document previously received from the web feed document server.

10. The system of claim 8, where in being programmed to assign the priority to rank the at least one change associated with the web feed document based upon the first location-based ranking criterion that specifies the web feed change ranking for the first determined location of the user computing device and the at least one user activity configured for the first location, the processor is programmed to:
retrieve a web feed change ranking profile comprising the first location-based ranking criterion from the memory;
analyze the at least one change associated with the web feed document based upon the first location-based ranking criterion within the web feed change ranking profile, the first determined location, and the at least one user activity configured for the first location; and
determine the priority assigned to the at least one change associated with the web feed document based upon the first location-based ranking criterion within the web feed change ranking profile, the first determined location, and the at least one user activity configured for the first location.

11. The system of claim 10, where:
the web feed change ranking profile further comprises at least one of a semantic ranking criterion, a structural ranking criterion, and a relevance ranking criterion;
in being programmed to determine the priority assigned to the at least one change associated with the web feed document based upon the first location-based ranking criterion within the web feed change ranking profile, the first determined location, and the at least one user activity configured for the first location, the processor is programmed to retrieve location coordinates of the first location from a global positioning system (GPS) module and determine whether the retrieved location coordinates match the location-based ranking criterion; and the processor is further programmed to determine whether the at least one change associated with the web feed document matches at least one of the semantic ranking criterion, the structural ranking criterion, and the relevance ranking criterion.

12. The system of claim 8, where in being programmed to assign the priority to rank the at least one change associated with the web feed document based upon the first location-based ranking criterion that specifies the web feed change ranking for the first determined location of the user computing device and the at least one user activity configured for the first location, the processor is programmed to:
query a remote server for information useable to interpret the at least one change associated with the web feed document;
receive the information useable to interpret the at least one change associated with the web feed document; and
assign the priority to the at least one change associated with the web feed document based upon the received information.

13. The system of claim 8, further comprising:
a display; and
where the processor is further programmed to:
display the at least one change associated with the web feed document with the assigned priority on the display to a user;
display the assigned priority in a location associated with the at least one change associated with the web feed document on the display;
sort the web feed document within a set of web feed documents based upon the assigned priority on the display; and
highlight the at least one change associated with the web feed document on the display.

14. The system of claim 8, where in being programmed to store the at least one change associated with the web feed document with the assigned priority to the memory, the processor is programmed to store the at least one change associated with the web feed document with the assigned priority to an output buffer and to send the at least one change associated with the web feed document with the assigned priority to a consumer electronics device.

15. A computer program product comprising:
a non-transitory computer useable storage medium comprising a computer readable program, where the computer readable program when executed on a computer causes the computer to:
monitor an incoming web feed received from a web feed document server for changes associated with a web feed document;
determine, based upon the monitoring of the incoming web feed, that at least one change associated with the web feed document has occurred, where the at least one change associated with the web feed document comprises metadata comprising at least one of an author-defined change rating of the at least one change defined in association with the web feed document and a publisher-defined change rating of the at least one change defined in association with the web feed document received from the web feed document server in association with the at least one change associated with the web feed document;
assign a priority to rank the at least one change associated with the web feed document based upon a first location-based ranking criterion that specifies web feed change ranking for a first determined location of a user computing device and at least one user activity configured for the first location, and based upon the received metadata;
store the at least one change associated with the web feed document with the assigned priority to a memory; and
re-rank, in response to a change of the user computing device to a second location, the at least one change associated with the web feed document based upon a second location-based ranking criterion that specifies web feed change ranking for the second location of the computing device and at least one user activity configured for the second location.

16. The computer program product of claim 15, where, in causing the computer to monitor the incoming web feed received from the web feed document server for changes to the web feed document, the computer readable program when executed on the computer causes the computer to:
receive, via the incoming web feed, the web feed document from the web feed document server; and
compare the received web feed document with a stored version of the web feed document previously received from the web feed document server; and
where, in causing the computer to determine that the at least one change associated with the web feed document has occurred, the computer readable program when executed on the computer causes the computer to identify the at least one change associated with the received web feed document relative to the stored version of the web feed document previously received from the web feed document server.

17. The computer program product of claim 15, where, in causing the computer to assign the priority to rank the at least one change associated with the web feed document based upon the first location-based ranking criterion that specifies the web feed change ranking for the first determined location of the user computing device and the at least one user activity configured for the first location, the computer readable program when executed on the computer causes the computer to:
retrieve a web feed change ranking profile comprising the first location-based ranking criterion from the memory;
analyze the at least one change associated with the web feed document based upon the first location-based ranking criterion within the web feed change ranking profile, the first determined location, and the at least one user activity configured for the first location; and
determine the priority assigned to the at least one change associated with the web feed document based upon the first location-based ranking criterion within the web feed change ranking profile, the first determined location, and the at least one user activity configured for the first location.

18. The computer program product of claim 17, where:
the web feed change ranking profile further comprises at least one of a semantic ranking criterion, a structural ranking criterion, and a relevance ranking criterion;
in causing the computer to determine the priority assigned to the at least one change associated with the web feed document based upon the first location-based ranking criterion within the web feed change ranking profile, the first determined location, and the at least one user activity configured for the first location, the computer readable program when executed on the computer causes the computer to retrieve location coordinates of the first location from a global positioning system (GPS) module and determine whether the retrieved location coordinates match the location-based ranking criterion; and where the computer readable program when executed on the computer further causes the computer to determine whether the at least one change associated with the web feed document matches at least one of the semantic ranking criterion, the structural ranking criterion, and the relevance ranking criterion.

19. The computer program product of claim 15, where, in causing the computer to assign the priority to rank the at least one change associated with the web feed document based upon the first location-based ranking criterion that specifies the web feed change ranking for the first determined location of the user computing device and the at least one user activity configured for the first location, the computer readable program when executed on the computer causes the computer to:

query a remote server for information useable to interpret the at least one change associated with the web feed document;

receive the information useable to interpret the at least one change associated with the web feed document; and assign the priority to the at least one change associated with the web feed document based upon the received information.

20. The computer program product of claim 15, where the computer readable program when executed on the computer further causes the computer to:

display the at least one change associated with the web feed document with the assigned priority on a display to a user;

display the assigned priority in a location associated with the at least one change associated with the web feed document on the display;

sort the web feed document within a set of web feed documents based upon the assigned priority on the display; and highlight the at least one change associated with the web feed document on the display.

21. The computer program product of claim 15, where, in causing the computer to store the at least one change associated with the web feed document with the assigned priority to the memory, the computer readable program when executed on the computer causes the computer to store the at least one change associated with the web feed document with the assigned priority to an output buffer and to send the at least one change associated with the web feed document with the assigned priority to a consumer electronics device.

22. A system, comprising:
a memory;
a display; and
a processor programmed to:

monitor an incoming web feed received from a web feed document server for changes associated with a web feed document;

receive, via the incoming web feed, the web feed document from the web feed document server;

receive metadata comprising at least one of an author-defined change rating defined in association with the web feed document and a publisher-defined change rating defined in association with the web feed document from the web feed document server;

compare the received web feed document with a stored version of the web feed document previously received from the web feed document server;

identify the at least one change associated with the received web feed document relative to the stored version of the web feed document previously received from the web feed document server;

retrieve a web feed change ranking profile comprising at least one ranking criterion from the memory;

analyze the at least one change associated with the web feed document based upon the web feed change ranking profile;

query a remote server for information useable to interpret the at least one change associated with the web feed document;

receive the information useable to interpret the at least one change associated with the web feed document;

determine a priority to rank the at least one change associated with the web feed document based upon a first location-based ranking criterion that specifies web feed change ranking for a first determined location of a user computing device and at least one user activity configured for the first location associated with at least one of the web feed change ranking profile, the received metadata, and the received information;

assign the determined priority to rank the at least one change associated with the web feed document based upon the first location-based ranking criterion that specifies the web feed change ranking for the first determined location of the user computing device and the at least one user activity configured for the first location;

store the at least one change associated with the web feed document with the assigned priority to the memory;

display the at least one change associated with the web feed document with the assigned priority on the display; and re-rank, in response to a change of the user computing device to a second location, the at least one change associated with the web feed document based upon a second location-based ranking criterion that specifies web feed change ranking for the second location of the computing device and at least one user activity configured for the second location.

* * * * *